US012785268B2

(12) United States Patent
Pander

(10) Patent No.: US 12,785,268 B2
(45) Date of Patent: Nov. 3, 2026

(54) BEAMFORMER INCLUDING METAMATERIAL CELL HAVING VARIABLE CAPACITANCE

(71) Applicant: NTT, Inc., Tokyo (JP)

(72) Inventor: Adam Pander, Tokyo (JP)

(73) Assignee: NTT, INC., Tokyo (JP)

( * ) Notice: Subject to any disclaimer, the term of this patent is extended or adjusted under 35 U.S.C. 154(b) by 290 days.

(21) Appl. No.: 18/702,712

(22) PCT Filed: Oct. 26, 2021

(86) PCT No.: PCT/JP2021/039504
§ 371 (c)(1),
(2) Date: Apr. 18, 2024

(87) PCT Pub. No.: WO2023/073810
PCT Pub. Date: May 4, 2023

(65) Prior Publication Data

US 2024/0421478 A1 Dec. 19, 2024

(51) Int. Cl.
*H01Q 3/36* (2006.01)
*H01Q 15/00* (2006.01)

(52) U.S. Cl.
CPC ........... *H01Q 3/36* (2013.01); *H01Q 15/0086* (2013.01)

(58) Field of Classification Search
CPC ............................ H01Q 3/36; H01Q 15/0086
USPC ........................................................ 342/371
See application file for complete search history.

(56) References Cited

U.S. PATENT DOCUMENTS 6,900,765 B2 * 5/2005 Navarro ............... H01Q 21/065 343/700 MS
10,218,067 B2 * 2/2019 Black ................ H01Q 15/0086
11,870,162 B2 * 1/2024 Davis .................... H01Q 21/08
2008/0165079 A1 * 7/2008 Smith .................... B82Y 20/00 343/911 R
2009/0262766 A1 * 10/2009 Chen ................. H01Q 15/0086 372/26
2013/0052463 A1 * 2/2013 Shelton ................. G02B 1/002 977/734

(Continued)

FOREIGN PATENT DOCUMENTS

JP 2015231184 A 12/2015
JP 2017175201 A 9/2017

OTHER PUBLICATIONS

Abdelrahman, Ahmed H. et al., "Bandwidth Improvement Methods of Transmitarray Antennas," IEEE Transactions on Antennas and Propagation, vol. 63, No. 7, Jul. 2015, 9 pages. As discussed in the specification.

(Continued)

*Primary Examiner* — Brady W Frazier
(74) *Attorney, Agent, or Firm* — Slater Matsil, LLP

(57) ABSTRACT

A beamformer of this invention is a beamformer configured to perform beamforming of an input electromagnetic wave and output an output electromagnetic wave, which includes a cell made of a metamaterial, and a filling material configured to fill a periphery of the cell. The metamaterial is made of a conductive organic material or a nanocarbon material. The filling material is made of a nonconductive organic material. The cell has an inductance and a capacitance. A phase of the input electromagnetic wave is changed by a change of at least one of the inductance and the capacitance.

19 Claims, 11 Drawing Sheets

(56) References Cited

U.S. PATENT DOCUMENTS

| | | | | |
|---|---|---|---|---|
| 2017/0069966 | A1* | 3/2017 | Black | H01Q 15/008 |
| 2018/0024226 | A1* | 1/2018 | Izadian | H01Q 21/24 342/188 |

OTHER PUBLICATIONS

Bonacchini, Giorgio E. et al., "Reconfigurable microwave metadevices based on organic electrochemical transistors," Nature Electronics, vol. 4, Jun. 2021, 424-428 pages. As discussed in the specification.

Uchendu, Iyemeh et al., "Survey of Beam Steering Techniques Available for Millimeter Wave Applications," Progress in Electromagnetics Research B, vol. 68, May 2016, 35-54 pages. As discussed in the specification.

* cited by examiner

BEAMFORMER INCLUDING METAMATERIAL CELL HAVING VARIABLE CAPACITANCE

CROSS-REFERENCE TO RELATED APPLICATIONS

This application is a national phase entry of PCT Application No. PCT/JP2021/039504, filed on Oct. 26, 2021, which application is hereby incorporated herein by reference.

TECHNICAL FIELD

The present invention relates to a beamformer using a metamaterial.

BACKGROUND

In high-frequency wireless communication, millimeter-wave antennas having high directivity are necessary, and beamforming is attracting attention. In beamforming, high-directivity electromagnetic radiation beams are formed by combining individual signals emitted from an array at various frequencies, and these high-directivity beams are steered, in order to maintain the signal quality.

In beamforming, a radiation beam in a specific direction is obtained by accurately matching the phases of signals input from different portions of the array. The phases are adjusted by using a configuration (phase array) obtained by arraying elements (e.g., antennas) for steering radiation beams, and connecting phase shifters.

In recent years, attention is paid to beamforming using a metamaterial because the metamaterial makes it possible to steer an electromagnetic wave at a desired frequency by its unique properties such as a refractive index, a permeability, and a permittivity. The metamaterial is an artificial medium, acquires characteristics from an embedded sub-wavelength structure in which the metamaterial is arranged in the same manner as atoms in an ordinary material, shows desired values of the permittivity and the permeability within a measured frequency domain, and steers an electromagnetic (EM) wave. The electromagnetic properties of the metamaterial result from the dimensions, shapes, directions, and layout of the periodic structures of a circuit and the materials made from these structures.

CITATION LIST

Non Patent Literature

NPL 1

Iyemeh Uchendu et al., "Survey of Beam Steering Techniques Available for Millimeter Wave Applications", Progress In Electromagnetics Research B, Vol. 68 (2016), p. 35-54.

NPL 2

Ahmed H. Abdelrahman et al., "Bandwidth Improvement Methods of Transmit array Antennas", IEEE Trans. Antennas Propag., Vol. 63, No. 7 (2015) p. 2946-2954.

SUMMARY

Technical Problem

However, beamforming using a metamaterial has the following problems.

First, the reflection coefficient of a radiation element, for example, an antenna is affected by the short distance of a metamaterial beamformer to the radiation element. In addition, the resonance frequency of the antenna changes depending on the adjusted state of the beamformer. Here, the adjusted state depends on the characteristics of constituent elements such as components and materials (metamaterials, filling materials, active elements, and the like) of the beamformer.

Second, since the steering region is increased by increasing a phase variation up to 360 degrees ($2\pi$), more layers of metamaterials are needed. However, the increase in the number of metamaterial layers increases insertion losses.

Third, metamaterial beamformer fabrication becomes more complex along with an increase of the operating frequency (wavelength). This is because the size of a resonant metamaterial cell decreases along with the increase of the operating frequency. Hence, for resonance excitation in a target frequency domain, the dimension tolerance decreases.

Furthermore, along with the increase of the operating frequency, the size of the active elements used for an active phase variation needs to be reduced. At a lower frequency, commercially available electronic components and variable capacitance elements (transistors, varactors, and the like) satisfy the size requirements. However, if the operating frequency increases to a 300-GHz band, the commercially available elements are too large, and active elements need to be added in the beamformer fabrication process. Most active elements are fabricated using a semiconductor technology that needs doping and high-temperature processing, and use a semiconductor wafer of Si, InP, GaAs, or the like as a material. Since it is necessary to use a complex technique to transfer (insert) an active element into that gap of a metamaterial cell, the process of fabricating the multilayer structure of the beamformer becomes complex, and the manufacturing cost increases. Also, the implementation of the active elements with biasing circuits also increases the complexity of the beamformer.

Fourth, the beamformer increases the overall size of the antenna. This is because the beamformer preferably has a flat structure since metamaterial cells made of a metal and active elements and biasing circuits made of a semiconductor, which constitute the metamaterial beamformer, are degraded (damaged) by a flexing or bending process. As described above, in the conventional beamformer based on metamaterial cells, since a firm and flat structure and material are used in a millimeter waveband, the insertion loss increases along with the increase in the cost, the manufacturing process becomes complex, and the design and shape are restricted.

Solution to Problem

In order to solve the above-described problem, according to embodiments of the present invention, there is provided a beamformer configured to perform beamforming of an input electromagnetic wave and output an output electromagnetic wave, characterized by comprising a cell made of a metamaterial, and a filling material configured to fill a periphery of the cell, wherein the metamaterial is made of one of a conductive organic material and a nanocarbon material, the filling material is made of a nonconductive organic material, the cell has an inductance and a capacitance, and a phase of the input electromagnetic wave is changed by a change of at least one of the inductance and the capacitance.

Advantageous Effects of Embodiments of the Invention

According to embodiments of the present invention, it is possible to provide a flexible beamformer that has high directivity and a small insertion loss and is easy to manufacture.

DETAILED DESCRIPTION OF ILLUSTRATIVE EMBODIMENTS

First Embodiment

A beamformer according to the first embodiment of the present invention will be described with reference to FIGS. 1 to 8B.

Configurations of Beamformer and Transmission System

Figure 1:
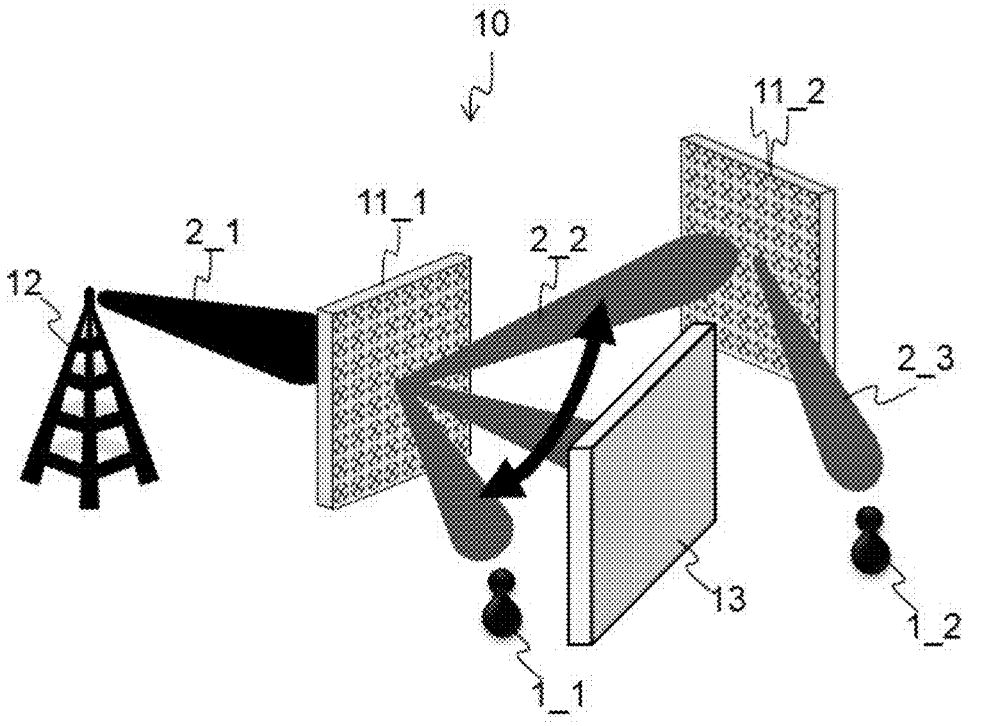
FIG. 1 is a schematic view of a transmission system using a beamformer according to the first embodiment of the present invention.

FIG. 1 is a schematic view of a transmission system 10 using a beamformer 11 according to this embodiment. In the transmission system 10, a transmit array metamaterial beamformer 11_1 and a reflectarray metamaterial beamformer 11_2 are used as the beamformer 11. A radiation element 12 such as an antenna radiates a millimeter wave (signal) of an arbitrary frequency. The millimeter wave (signal) is transmitted through the transmit array metamaterial beamformer 11_1, reflected by the reflectarray metamaterial beamformer 11_2, and then transmitted.

The metamaterial beamformer 11 includes a cell (to be referred to as a "metamaterial cell" hereinafter) made of a metamaterial, a filling material, and a capacitance element.

Also, the metamaterial beamformer 11 is fabricated mainly using an organic compound such as polymer. Since a material such as a polymer normally has a low permittivity ($\varepsilon_r$) and a small loss tangent (tan δ), the transmission loss of an incident electromagnetic wave (input signal) is low. In the metamaterial beamformer 11, when the conventional material is replaced with an organic compound, a loss associated with a resonant cell, a filling material, an active element such as a capacitance element, and a wire decreases.

The metamaterial cell is designed to resonate at a millimeter-wave frequency (30 to 500 GHz). Also, the metamaterial cell is fabricated using an organic conductive material. Here, as the organic conductive material, polyethylenedioxythiophene:polystyrene sulfonate (PEDOT:PSS), which is a conjugated conducting polymer, is used. Alternatively, a conductive polymer such as doped polyacetylene, polypyrrole, or polyaniline may be used. Other nanocarbon materials with high conductivity, for example, carbon nanotubes, graphene, or the like may be used.

The filling material forms the most part of the metamaterial beamformer 11 and fills the periphery of the metamaterial cell. As the filling material, a nonconductive polymer is used. Also, various kinds of nonconductive organic materials (including insulating organic materials) such as fluoropolymers, polyimide (PI), benzocyclobutene (BCB), parylene, polyethylene (PE), and the like may be used.

The capacitance element is a variable capacitance element and is controlled by an applied bias voltage. For example, various kinds of organic electrical components with variable capacitances such as an organic varactor and an organic thin-film transistor can be used. A low-molecular organic compound is used for the variable capacitance element. An organic material such as a conjugated oligomer or a conjugated polymer may be used.

As described above, the variable capacitance element is fabricated using a p-n semiconductor polymer or a conductive polymer serving as an electrode in place of a conventional bulk semiconductor or metal material. Here, the variable capacitance element can be fabricated using simple processes such as spin coating, drop-casting, various kinds of printing methods, and can be fabricated in the metamaterial cell fabrication process without needing an additional transfer method.

Here, to apply a bias voltage to the variable capacitance element, a biasing circuit is mounted.

Since the permittivity of the polymer material used for the metamaterial beamformer 11 is much lower than that of a semiconductor material such as Si, InP, or GaAs, as described above, the transmission loss of the active element decreases. A polymer is used for the filling material as well, which has a high resistivity, a low permittivity, and a small loss tangent.

In addition, the metamaterial beamformer 11 can easily be fabricated as compared to a conventional beamformer having a complex configuration. Since the whole metamaterial beamformer 11 that actively operates is fabricated using organic materials, it is unnecessary to use components of metal materials or semiconductor materials.

As described above, since the whole metamaterial beamformer 11 is fabricated using organic materials, the flexibility of the metamaterial beamformer 11 increases (Daniel Corzo et al., "Flexible Electronics: Status, Challenges and Opportunities", Front. Electron., Vol. 1 (2020) Article 594003, p. 1-13. https://doi.org/10.3389/felec.2020.594003.). The flexible beamformer 11 can be used in a space which is small or has an irregularly shape and in which a conventional firm and inflexible beamformer cannot be used. Hence, if it is possible to make the most of a usable space, a wide area can be covered by a wireless network.

In addition, since most polymers are partially transparent under visible light, the metamaterial beamformer 11 is neutral in visual term as compared to a normal beamformer.

In the transmission system 10, as shown in FIG. 1, a signal (an electromagnetic wave, for example, a millimeter wave) 2_1 transmitted (radiated) from the radiation element 12 such as an antenna enters the transmit array metamaterial beamformer 11_1 and undergoes beamforming by the transmit array metamaterial beamformer 11_1. Then, the electromagnetic wave with an adjusted exit (radiation) angle exits (is transmitted).

The transmitted electromagnetic wave 2_2 is directly received by a user. Alternatively, the electromagnetic wave 2_2 is reflected by the reflectarray metamaterial beamformer 11_2 to avoid an obstacle 13 and received by a user 1_2.

Here, the input signal and the output signal of the metamaterial beamformer 11 have the same frequency.

In the metamaterial beamformer 11, first, if the capacitance elements are biased by the same voltage, the electromagnetic wave is transmitted without a phase variation. The output wave propagates in the same direction as the input wave.

Second, if different bias voltages are applied to the active elements (capacitance elements), the value of a lumped capacitance changes, and different capacitance values are generated in the metamaterial cells of the metamaterial beamformer 11. Since the phase of the transmission signal changes in accordance with the change of the capacitance, the combined output wave is steered in a desired direction and directly transmitted to a user 1_1.

In addition, the combined output wave is indirectly transmitted to the user 1_2 via another network such as the reflectarray metamaterial beamformer 11_2.

Third, if a bias voltage is applied to each capacitance element to change the capacitance value and shift the transmission range to the side where the signal transmissivity is low, the metamaterial beamformer 11 does not pass the incident millimeter wave.

The phase variation between the groups of the metamaterial cells is calculated concerning the horizontal direction by Equation 1

$$\psi_x = \frac{-2\pi \times p \times \cos(E) \times \sin(A)}{\lambda} \quad (1)$$

The phase variation is also calculated concerning the vertical direction by

Equation 2

$$\psi_y = \frac{-2\pi \times p \times \sin(E)}{\lambda} \quad (2)$$

where A is the azimuth angle, E is the elevation angle, p is the period or distance between cells, and λ is the wavelength of the incident wave (for example, 1 mm at 300 GHz).

Figure 2:
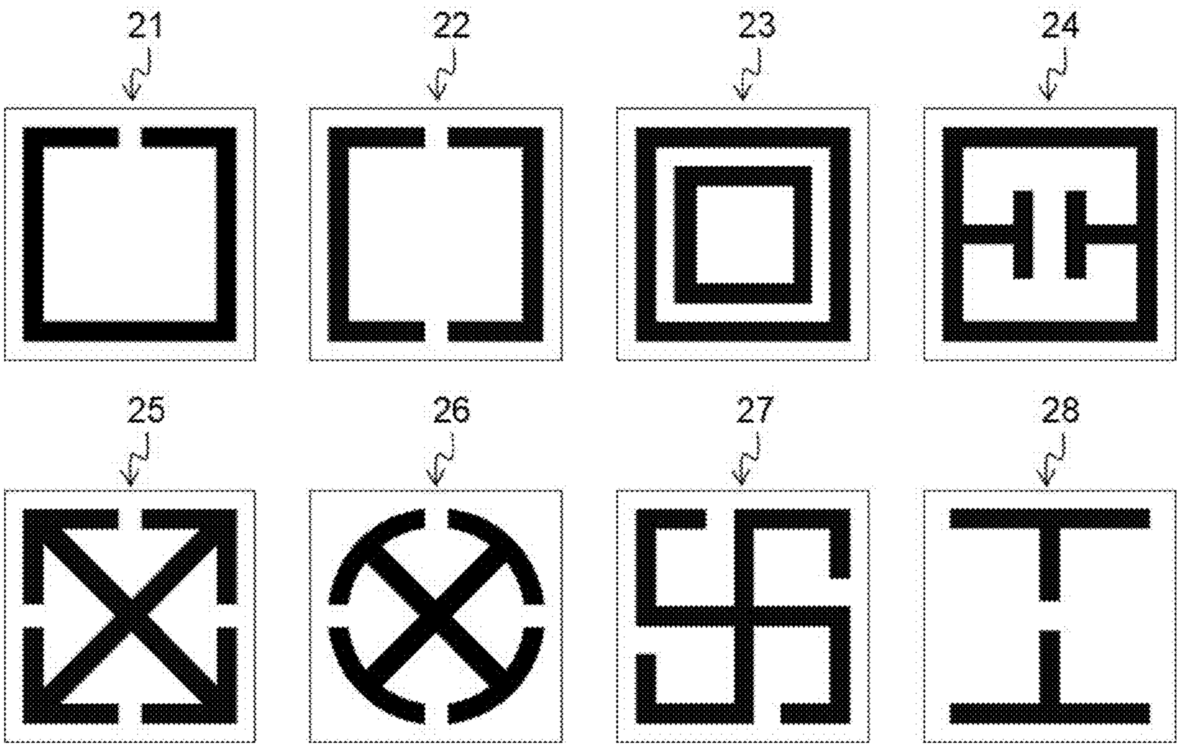
FIG. 2 is a schematic front view showing an example of the configuration of a metamaterial unit cell in the beamformer according to the first embodiment of the present invention.

FIG. 2 shows, as examples (front views) of the geometrical shape types of metamaterial unit cells, a split-ring resonator 21, a double split-ring resonator 22, a square double loop 23, an electric resonator 24, a square Jerusalem cross 25, a round Jerusalem cross 26, a square spiral 27, and an I-shape resonator 28.

The metamaterial unit cell is line-symmetric or point-symmetric, is made of a metamaterial medium (for example, an organic material) surrounding the periphery or a part thereof, and includes at least one gap in the metamaterial medium.

Here, the gap is a discontinuous portion in the metamaterial medium. In the discontinuous portion, end faces of the metamaterial medium face each other. The end faces are preferably arranged in parallel but need not always be parallel.

In the metamaterial beamformer 11, for example, metamaterial cells each having a shape shown in FIG. 2 are formed in a single layer or multiple layers on a polymer dielectric substrate.

In a gap of a metamaterial cell, a fixed capacitance coupled with an external electric field generated from a radiation element such as an antenna is introduced. In addition, a variable capacitance element needs to be introduced into the gap to control the total capacitance value that changes the phase of a signal transmitted through the metamaterial cell.

The size, shape, and period of metamaterial resonant cells are optimized to achieve a desired frequency domain in order to be used at the millimeter-wave band.

Figure 3:
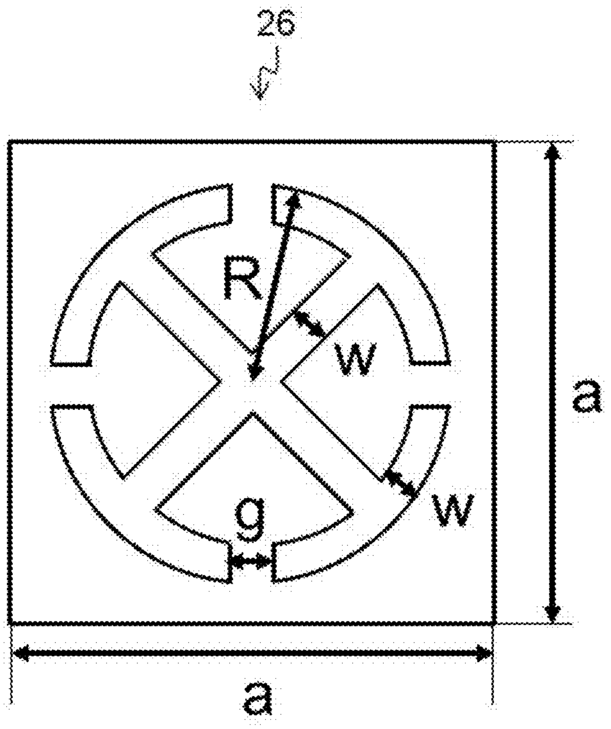
FIG. 3 is a view for explaining an example of the configuration of the metamaterial unit cell in the beamformer according to the first embodiment of the present invention.

FIG. 3 shows a schematic view of a resonant cell with geometrical parameters using an example of the round Jerusalem cross 26.

Figure 4:
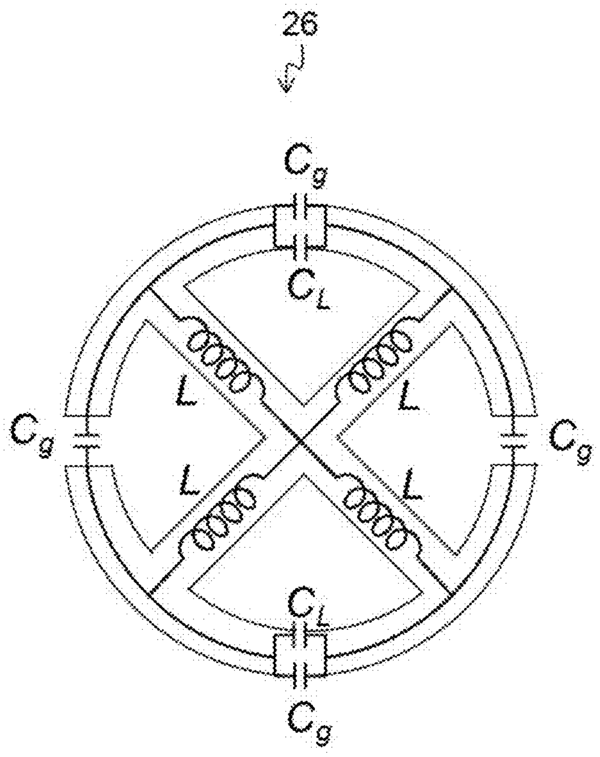
FIG. 4 is a view for explaining an example of the configuration of the metamaterial unit cell in the beamformer according to the first embodiment of the present invention.

Also, FIG. 4 shows a schematic view of the resonant cell together with an equivalent electric circuit.

The resonant frequency of a metamaterial cell can be calculated by

Equation 3

$$f_R = \frac{1}{2\pi\sqrt{LC_T}} \propto \frac{1}{\text{size}} \tag{3}$$

where L is the equivalent inductance, and $C_T$ is the equivalent capacitance of the metamaterial cell. The equivalent inductance L is calculated by Equation 4

$$L = \frac{\mu_0 \pi R^2}{t} \propto \text{size} \tag{4}$$

where $\mu_0$ is the permeability in vacuum, R is the radius of the metamaterial cell (with an assumption of a round cell), and t is the thickness of the conductive organic material.

The equivalent capacitance $C_T$ is formed by a gap capacitance Cg and a load capacitance $C_L$ of the lumped capacitive element, as expressed by equations (5) and (6). As shown in FIG. 4, the gap capacitance Cg and the load capacitance $C_L$ of the lumped capacitance element are connected in parallel. That is, the lumped capacitance element (variable capacitance element) is electrically connected in parallel to the gap.

Equation 5

$$C_T = \frac{\varepsilon_0 \varepsilon_c wt}{g} \propto \text{size} \tag{5}$$

Equation 6

$$C_T = C_g + C_L \tag{6}$$

Where $\varepsilon_o$ and $\varepsilon_c$ are the vacuum permittivity and the effective permittivity of the material (the filling material in this embodiment) between the gaps of the capacitor, respectively. In addition, w is the width of the metamaterial medium, and g is the gap length in the metamaterial cell. Since $C_T$ and L are proportional to the size of the metamaterial cell, the resonance frequency is inversely proportional to the size.

In addition, a shown in FIG. 3 is the metamaterial period. The size of the metamaterial cell is decided by the metamaterial period a.

For resonance excitation, the size of the metamaterial cell is equal to or less than the wavelength λ of the millimeter wave to operate and, more preferably, λ/2 or less. If the period is a in a square metamaterial cell, the period a is preferably equal to or less than λ. For a rectangular metamaterial cell with two sides (periods), the period on the short side is preferably equal to or less than λ.

(Basic Operation of Beamformer)

The basic operation of the beamformer 11 according to this embodiment will be described with reference to FIGS. 5 to 8B.

Figure 5:
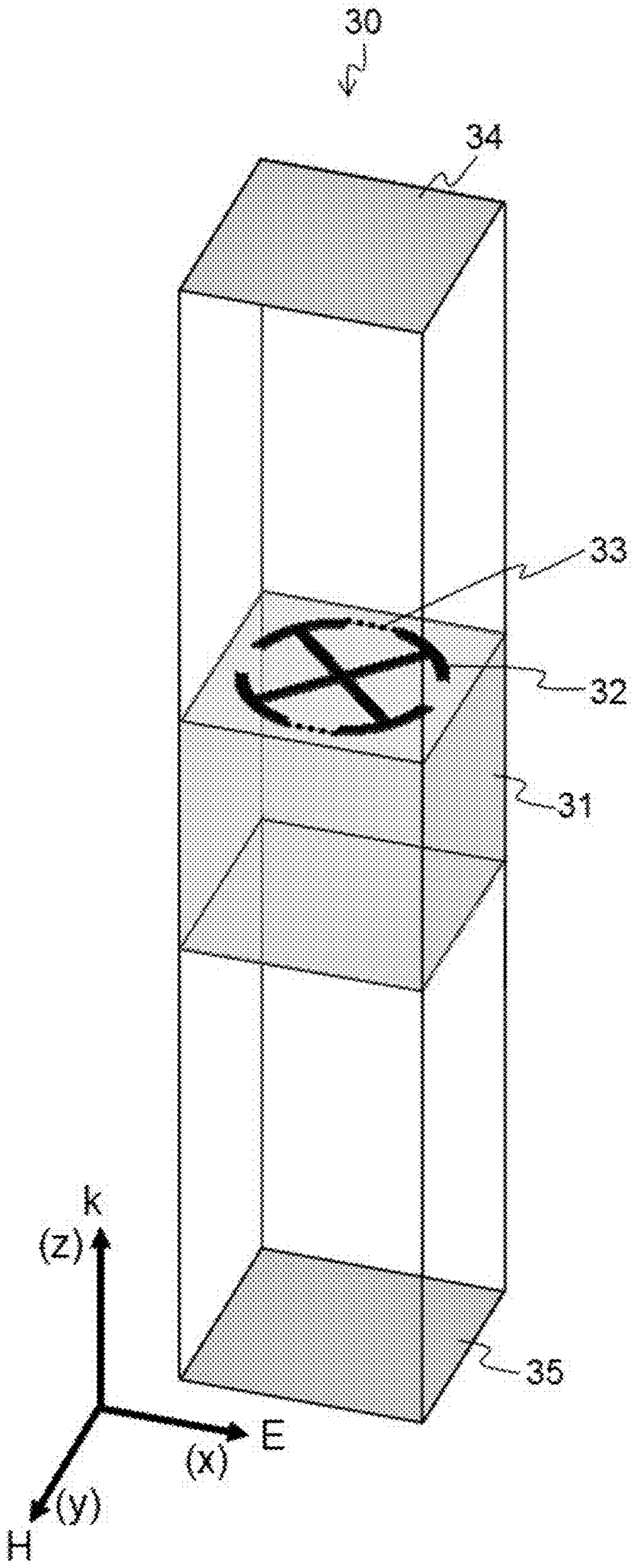
FIG. 5 is a schematic perspective view showing an example of the configuration of the beamformer according to the first embodiment of the present invention.

FIG. 5 shows an example of a metamaterial resonant cell used in a simulation. A metamaterial resonant cell 32 was adjusted to the 300-GHz band. As an example, a round metamaterial cell based on the so-called Jerusalem cross was used as the metamaterial resonant cell 32. For the metamaterial resonant cell 32, PEDOT:PSS as a conductive polymer was used, and the conductivity was 2000 S/cm.

A polyimide substrate 31 was made of the filling material of the beamformer. The permittivity $\varepsilon_r$ was 2.4, the tangent loss tan δ was 0.003, and the thickness was 400 μm. These are values (constants) for a typical polyimide substrate used in the millimeter wave band.

As shown in FIG. 5, the metamaterial resonant cell 32 was arranged in the horizontal direction and was perpendicular to an incident electromagnetic wave radiated from a PORT1 (34) and received by a PORT2 (35). As for the direction of a gap to which a lumped capacitance element 33 was connected, the gap was arranged along the x-axis so as to be parallel to the direction of the component of an electric field E of the electromagnetic wave. Here, the gap direction is the direction perpendicular to the end faces that face and form the gap. Hence, the electric field is coupled with the gap of the metamaterial cell, and resonance occurs.

This calculation was executed for the electric field component of the electromagnetic wave along the x-axis using a time-domain solver while setting approximate periodic boundary conditions in the vertical incident direction.

With the assumption that the period of the metamaterial cell 32 is constant, the geometrical parameters of the metamaterial, such as the gap length, the cell size, and the width of the metamaterial were optimized with an initial lumped capacitance of 0 fF, to achieve a high transmission coefficient S21 of −3 dB or more in the 300-GHz frequency band.

Figure 6A:
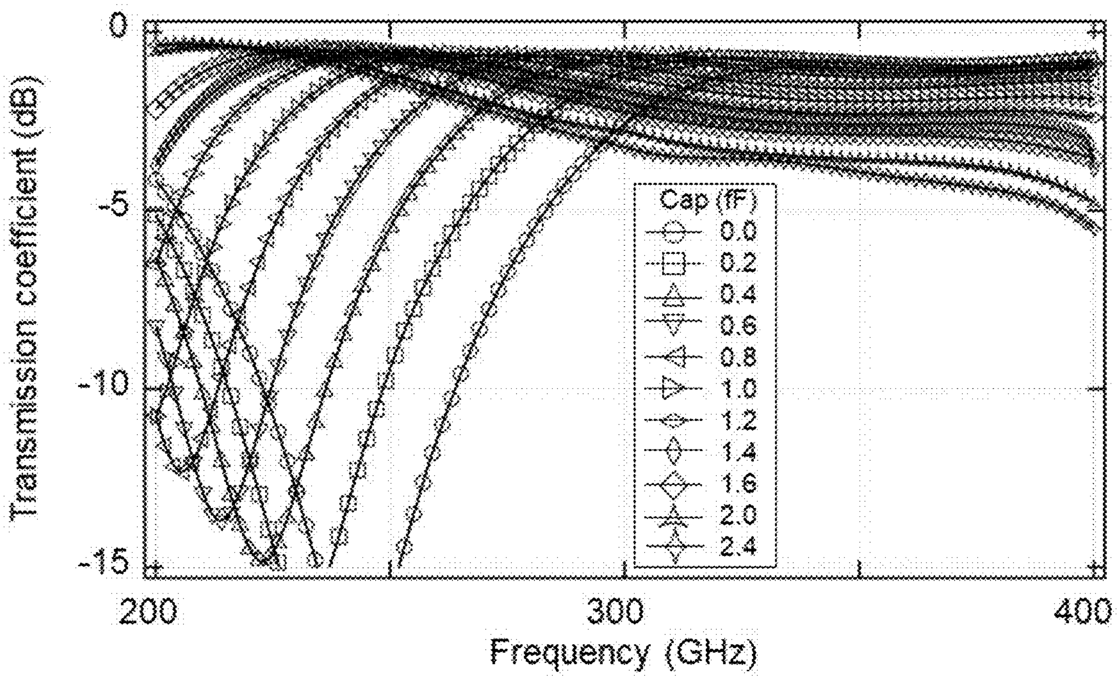
FIG. 6A is a view for explaining the operation of the beamformer according to the first embodiment of the present invention.

FIG. 6A shows an example of the transmission coefficient S21 spectrum when the lumped capacitance changes from 0 to 2.4 fF. The transmission coefficient S21 spectrum was simulated for the single-layer round Jerusalem cross metamaterial cell 32 optimized in the 300-GHz frequency band shown in FIG. 5.

When the lumped capacitance increases from 0 to 2.4 fF, a frequency domain (to be referred to as a "high transmission region" hereinafter) exhibiting a flat characteristic with the transmission coefficient S21 of −3 dB or more shifts to the low frequency side. In this way, high transmission of the electromagnetic wave at a frequency of 300 GHz can be obtained for a lumped capacitance from 0 to 2.4 fF.

Also, since the initial value of the lumped capacitance in the metamaterial cell 32 is designed as 0 fF, the sensitivity and the degree of change are larger in a low capacitance value of 0 to 1.4 fF as compared to a high capacitance value of 1.6 to 2.4 fF.

Figure 6B:
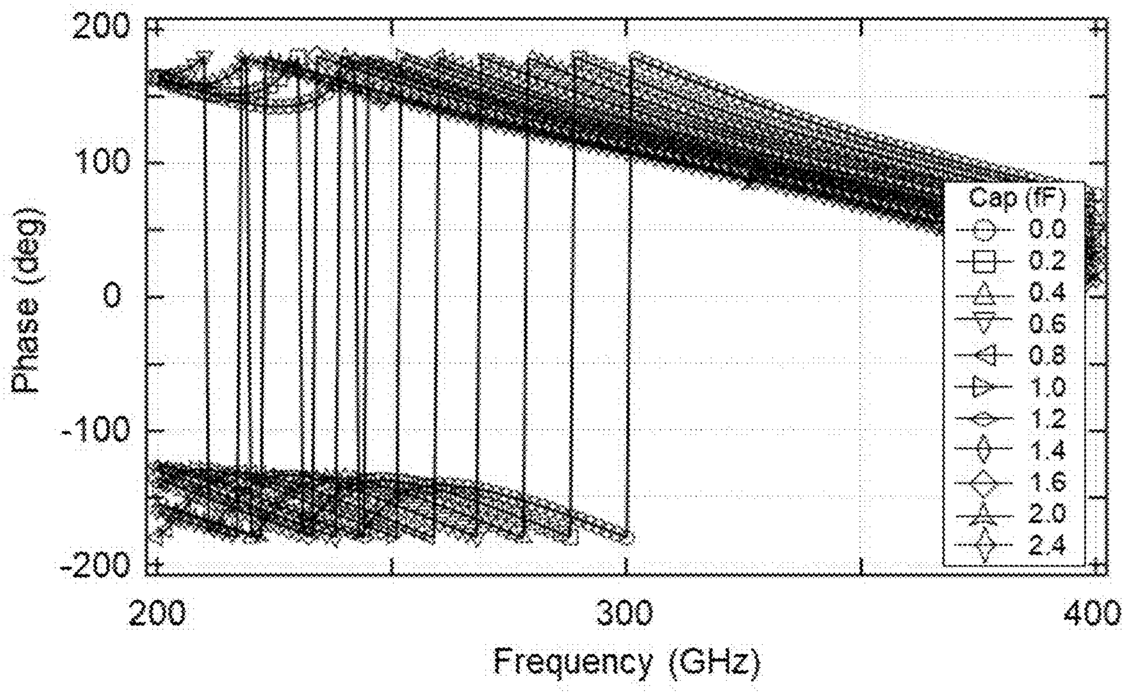
FIG. 6B is a view for explaining the operation of the beamformer according to the first embodiment of the present invention.

FIG. 6B shows a phase variation spectrum in the 300-GHz frequency band when the lumped capacitance changes from 0 to 2.4 fF. A simulation was conducted for the single-layer round Jerusalem cross metamaterial cell 32, like the above-described case.

For example, when the capacitance changes from 0 to 2.4 fF at 300 GHz, the phase variations from 180 degrees to 110 degrees. In this way, a total phase variation of about 70 degrees can be obtained at 300 GHz in the capacitance region from 0 to 2.4 fF.

Figure 7:
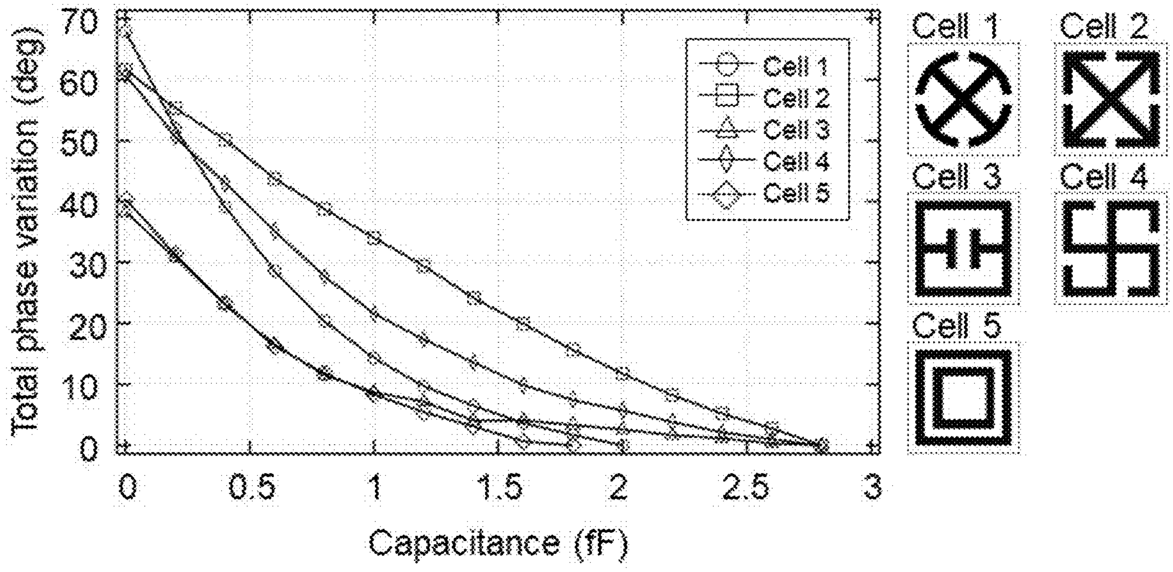
FIG. 7 is a view for explaining the operation of the beamformer according to the first embodiment of the present invention.

FIG. 7 shows the simulation result of the total phase variation of a transmitted electromagnetic wave with respect to a lumped capacitance change for different geometrical shape types of the metamaterial unit cell. Metamaterial unit cell shapes (Cell 1 to Cell 5) shown in the insets of FIG. 7 were used for the simulation. In addition, the shape and the size of each metamaterial unit cell were optimized such that both the largest transmission region width and the largest phase variation were obtained.

In cell 1 (Cell 1), a phase variation of 70 degrees was obtained. In cell 3 (Cell 3) and cell 5 (Cell 5), a phase variation of about 40 degrees was obtained.

As described above, by changing the shape of the metamaterial unit cell, the inductance and/or capacitance of the cell can be changed, and the change of the phase of the transmitted electromagnetic wave can be increased.

Furthermore, it is considered that in addition to the preset characteristic of the beamformer, additional effects such as electric field rotation and cross-polarization can be obtained when the electromagnetic wave is transmitted.

Figure 8A:
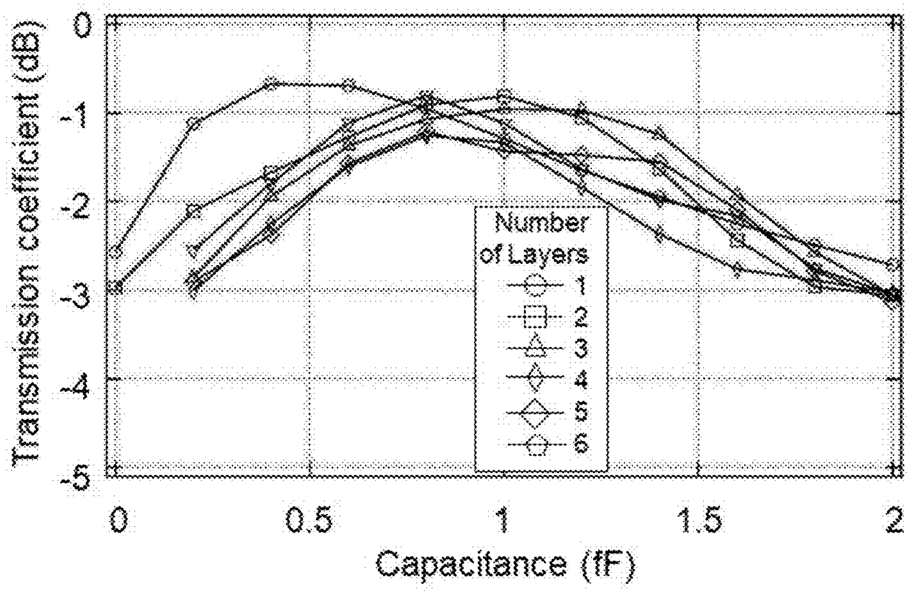
FIG. 8A is a view for explaining the operation of the beamformer according to the first embodiment of the present invention.
Figure 8B:
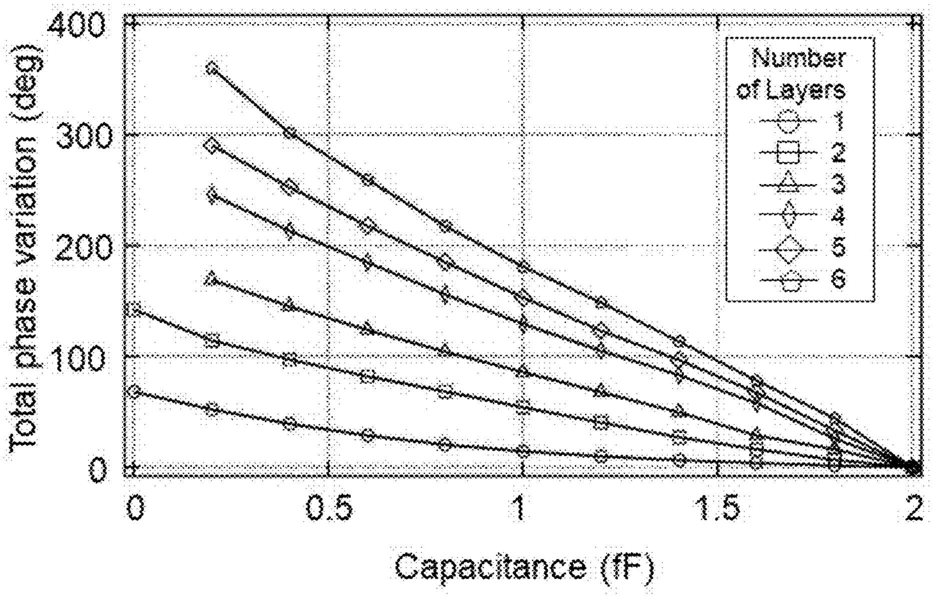
FIG. 8B is a view for explaining the operation of the beamformer according to the first embodiment of the present invention.

FIGS. 8A and 8B show the simulation results of the transmission coefficient of a propagating millimeter wave and a total phase variation with respect to the change of the lumped capacitance when the number of metamaterial cell layers of the metamaterial beamformer 11 changes.

FIG. 8A shows high transmission of the electromagnetic wave for a variation within the range of 0 to 3 dB along with the increase in the number of layers.

On the other hand, in FIG. 8B, a remarkable phase variation is observed along with the increase in the number of layers. In the capacitance change from 0 to 2 fF, the total phase variation changes by 70 degrees when the number of layers is 1, and changes up to 360 degrees when the number of layers is 6. Here, when the capacitance value is 0 fF, the transmission coefficient degrades to −3 dB or less in a metamaterial multilayer structure including three or more layers. Hence, plot of the phase variation is omitted.

As described above, the number of layers is increased, thereby expanding the variable phase region and enabling variable phase control in the metamaterial beamformer 11. Here, when the number of layers is increased, the transmission decreases a little. However, troubles hardly occur in the metamaterial beamformer.

As described above, according to the metamaterial beamformer of this embodiment, it is possible to cover the entire high transmission region at 300 GHz by a capacitance change of about 0 to 2.4 fF and freely control the phase in 360 degrees (2π). As a result, beamforming at a wide angle is possible.

Example 1

A beamformer according to Example 1 of the present invention will be described with reference to FIGS. 9A to 11.

(Basic Configuration of Beamformer)

The beamformer according to this example is a metamaterial beamformer based on an organic material. In addition, as described above, this is a beamformer (active beamformer) that actively operates. The capacitance of a lumped active element in a multilayer transmit array is gradually changed, thereby controlling the phase of an incident millimeter wave and radiating it in a desired direction in beamforming.

In the simulated metamaterial beamformer, a specific permittivity $\varepsilon_{r1}$ and a specific permeability μ of a filling material of polyimide are $\varepsilon_{r1}$=2.4 and μ=1, respectively, and a thickness $t_s$ of the substrate is $t_s$=0.9 mm. A tangent loss tan δ is 0.003. The parameters of the polyimide material are normal product data for the millimeter wave frequency band. The capacitance element is a simple lumped varactor diode and is directly fabricated in the polyimide material in the gap region of a metamaterial cell.

A round Jerusalem cross metamaterial cell is formed by a 3 μm thick PEDOT:PSS thin film and directly fabricated in the polyimide filling material. The parameters of the metamaterial cell will be described below.

The outer diameter of the round Jerusalem cross metamaterial cell is R=160 μm, the gap length is g=80 μm, the width of the metamaterial medium is w=20 μm, and the cell period a=380 μm. Six layers having the same shape are stacked at an inter layer distance of 180 μm. Here, the total substrate thickness $t_s$ is 0.9 mm. The above described parameters were adjusted to obtain a high transmission coefficient S21 of 3 dB or more at 300 $GH_z$ for different lumped capacitance values.

In this example, an example in which a varactor diode is used as the capacitance element has been described. However, the capacitance element may be an active element such as a transistor. The active element such as a varactor diode or a transistor is fabricated using p- and n-type semiconductor polymers.

In the varactor diode, the capacitance is controlled by a combination of the characteristics of a p-n junction or the area of a fabricated diode. Here, the characteristics of a p-n junction include carrier (electrons and holes) mobility, the transparency of a polymer film, the p-n junction polymer film thickness, and the like.

In the transistor, the total capacitance change is obtained from the intrinsic capacitance between electrodes (capacitances in a source, a drain, and a gate).

(Basic Operation of Beamformer)

Figure 9A:
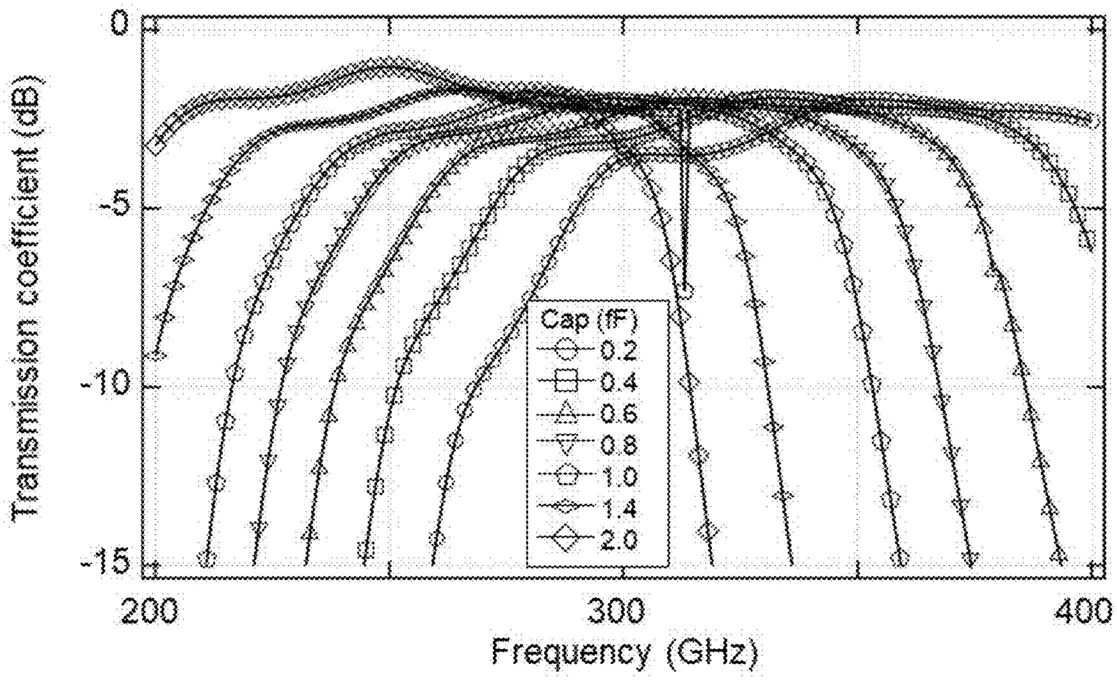
FIG. 9A is a view for explaining the operation of the beamformer according to Example 1 of the present invention.

FIG. 9A shows the transmission spectra of the simulated beamformer for different capacitance values (0.2 to 2 fF). For the 6-layer metamaterial beamformer, high transmission of −3 dB or more is observed in the capacitance region from 0.2 to 2 fF.

Figure 9B:
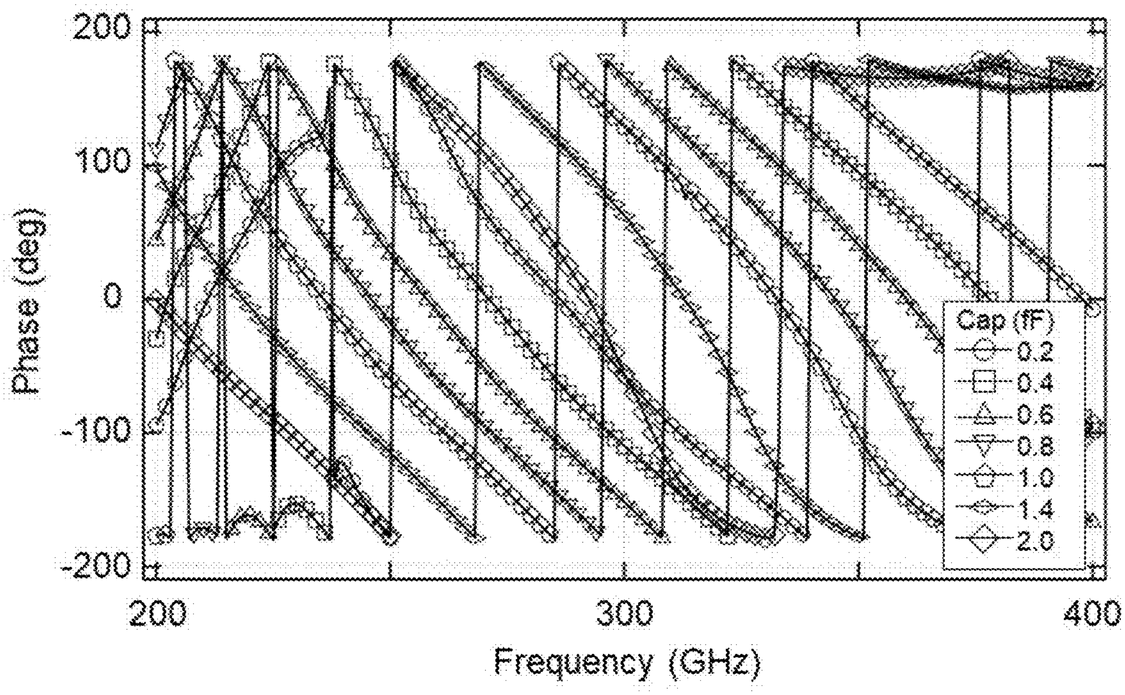
FIG. 9B is a view for explaining the operation of the beamformer according to Example 1 of the present invention.

FIG. 9B shows the phase variation spectra for the same capacitance value changes. By the capacitance change from 0.2 to 2 fF, a phase variation of 360 degrees (2π) is observed. This indicates that beamforming adjustable in a wide angle is possible, and phase control can be performed correctly in any region. Also, the total phase variation at this time is the phase variation in a case in which the number of metamaterial cell layers in FIG. 8B is 6.

As described above, as is apparent from the basic configuration of the beamformer according to the above described example, a high transmission characteristic and a phase variation of 360 degrees (2π) can be obtained. A beamformer designed based on the above described basic configuration will be described next.

(Configuration of Beamformer)

Figure 10A:
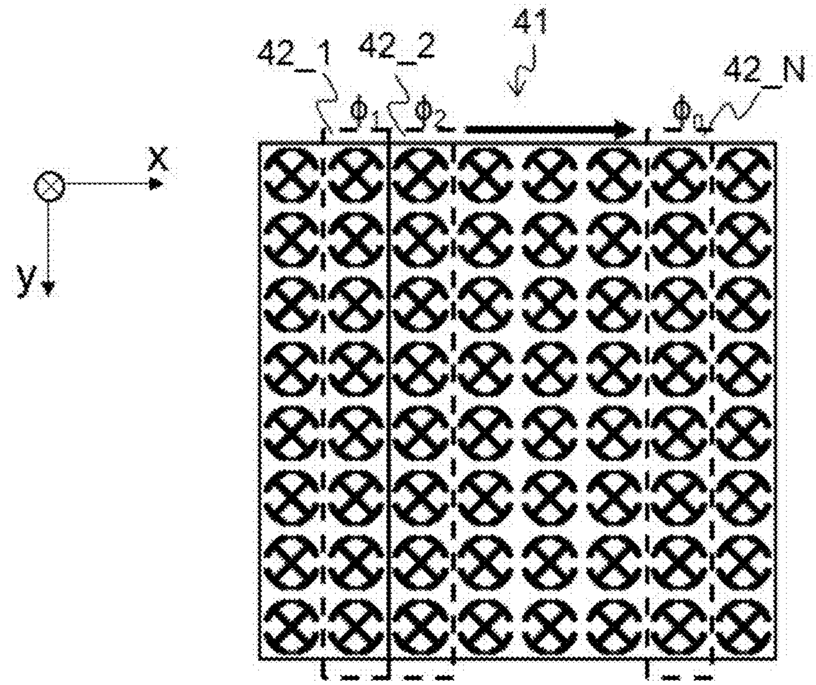
FIG. 10A is a schematic front view for explaining the operation of the beamformer according to Example 1 of the present invention.
Figure 10B:
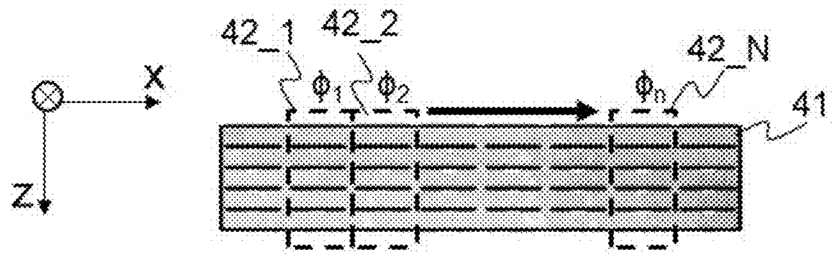
FIG. 10B is a schematic plan view for explaining the operation of the beamformer according to Example 1 of the present invention.
Figure 10C:
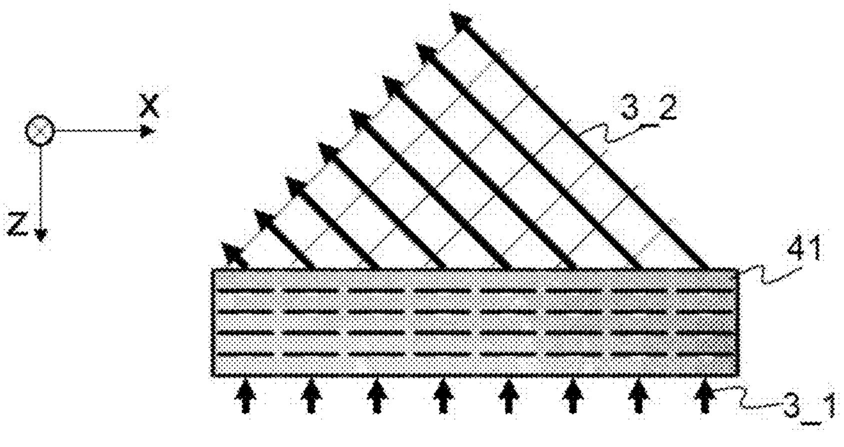
FIG. 10C is a schematic front view for explaining the operation of the beamformer according to Example 1 of the present invention.

FIGS. 10A to 10C show the schematic views of a metamaterial beamformer 41 used in the simulation. The metamaterial beamformer 41 is formed as a round Jerusalem cross metamaterial multilayer structure in the form of a square, that is, an array in which cells are arranged periodically in the row direction and in the column direction. Here, the size and shape of the actual device are limited by the fabrication technique (for example, the wafer size, the allowable size of the device to be fabricated, and the like).

In the metamaterial beamformer 41, as shown in FIG. 10A, the metamaterial cells are arranged on a plane (y-z plane) formed from one direction of the surface (x-y plane), for example, the column direction (y direction) and the thickness direction (z direction), thereby forming groups 42_1 to 42_N.

As shown in FIGS. 10A and 10B, in each group, for example, in the group 42_1, identical lumped capacitance values are set for the metamaterial cells. In addition, the lumped capacitance values of the groups 42_1 to 42_N are set to gradually change in the other direction of the surface (x-y plane), for example, the row direction (x direction).

As shown in FIG. 10C, an incident wave 3_1 is transmitted through the metamaterial beamformer 41 with phase variations Ø1 to Øn in the groups 42_1 to 42_N. Electromagnetic waves transmitted through the groups 42_1 to 42_N are combined and output (combined output wave 3_2).

The radiated output wave is radiated in a desired direction by selecting a capacitance value corresponding to each metamaterial cell group shown in FIGS. 10A to 10C based on the relationship (FIG. 8B) between the lumped capacitance value and the total phase variation. A correct phase shift between adjacent groups of the metamaterial beamformer is calculated by equations (1) and (2). In beamforming, since the phase is changed only in one direction of a single plane, an elevation angle E=0 and an azimuth angle A=θ are assumed. Here, θ is the steering angle of the combined output wave.

(Operation of Beamformer)

Figure 11:
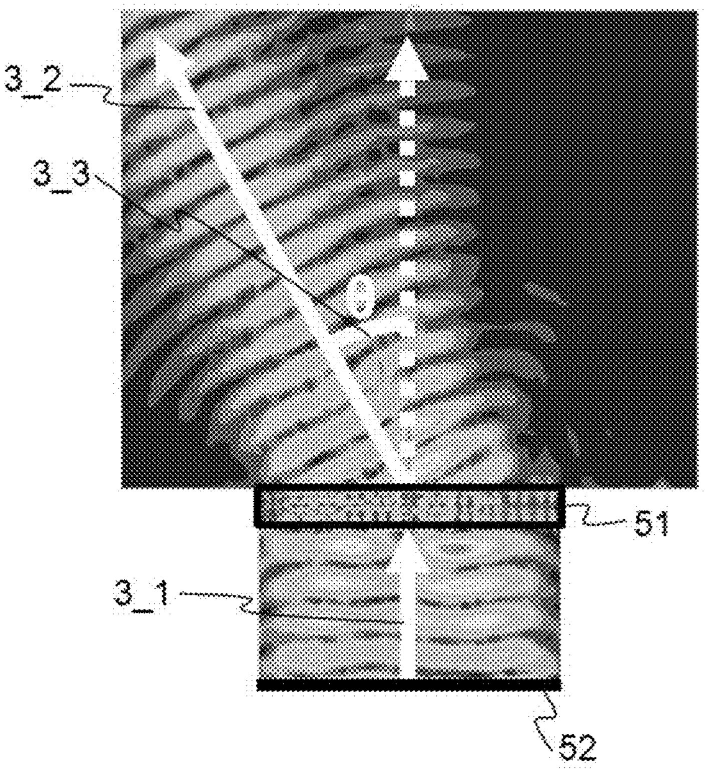
FIG. 11 is a view for explaining the operation of the beamformer according to Example 1 of the present invention.

FIG. 11 shows the simulation result of signal propagation by a transmit array metamaterial beamformer 51. In the simulation, multilayer (6 layer) cells are used in the metamaterial beamformer, and the cells are arrayed in a rectangle with 11 columns (groups) and 7 rows (11×7, x=11, y=7).

The capacitance values of the 11 groups in the 11×7 multilayer cell elements were set as shown in Table 1.

TABLE 1

| Capacitance element | $C_1$ | $C_2$ | $C_3$ | $C_4$ | $C_5$ | $C_6$ | $C_7$ | $C_8$ | $C_9$ | $C_{10}$ | $C_{11}$ |
|---|---|---|---|---|---|---|---|---|---|---|---|
| Capacitance value (fF) | 0.9 | 0.53 | 0.27 | 1.8 | 1.41 | 1 | 0.64 | 0.33 | 1.87 | 1.51 | 1.06 |

The input wave (signal) 3_1 from a millimeter wave radiation source (for example, an antenna) 52 is radiated to the surface of the metamaterial beamformer 51. The input wave 3_1 is transmitted through the beamformer 51. The phase of the electromagnetic wave changes because of the change of in the capacitance in each group, and the combined output wave 3_2 is steered at the angle θ (3_3). In this example, the combined wave is output at the angle θ of 30 degrees at 300 GHz.

According to the beamformers of the embodiment and the example, beamforming adjustable in a wide angle is implemented using a metamaterial beamformer based on an organic material. In addition, as compared to the conventional firm beamforming structure, the loss of the active beamformer decreases, and the complexity and cost are the same because of the simplified fabrication process.

Second Embodiment

A beamformer according to the second embodiment of the present invention will be described with reference to FIG. 12.

(Basic Configuration of Beamformer)

The beamformer according to this embodiment is a beamformer (passive beamformer) that passively operates, and organic variable capacitance elements are not mounted. This beamformer is effective if millimeter-wave beamforming has little requirements and the direction of radiating a combined output wave is one or two predetermined directions.

Furthermore, the passive beamformer is used as a kind of lens placed directly in front of a radiation element to focus a spherical wavefront, thereby generating a more focused plane wavefront. In this case, to simplify the structure and reduce the cost, active elements can be omitted.

The desired transmission direction is decided by adjusting the shape of metamaterial cells in each group of the metamaterial beamformer, instead of actively changing the capacitances of the metamaterial cells.

In this adjustment, a series of metamaterial cells are designed based on the change of one geometrical feature, for example, the change of the gap length or the change of the width and length (for example, the length of an arm) of the metamaterial medium. The inductance and/or the capacitance changes for the shape (geometrical feature) of each metamaterial cell, and a phase variation is obtained.

By combining various shapes and taking the parameters based on equations (1) and (2) into consideration, the planar arrangement of sub-wavelength phase-shifting unit cells is configured together with various preset phase distributions in the beamformer, and beamforming of the combined output wave is implemented.

(Basic Operation of Beamformer)

Figure 12:
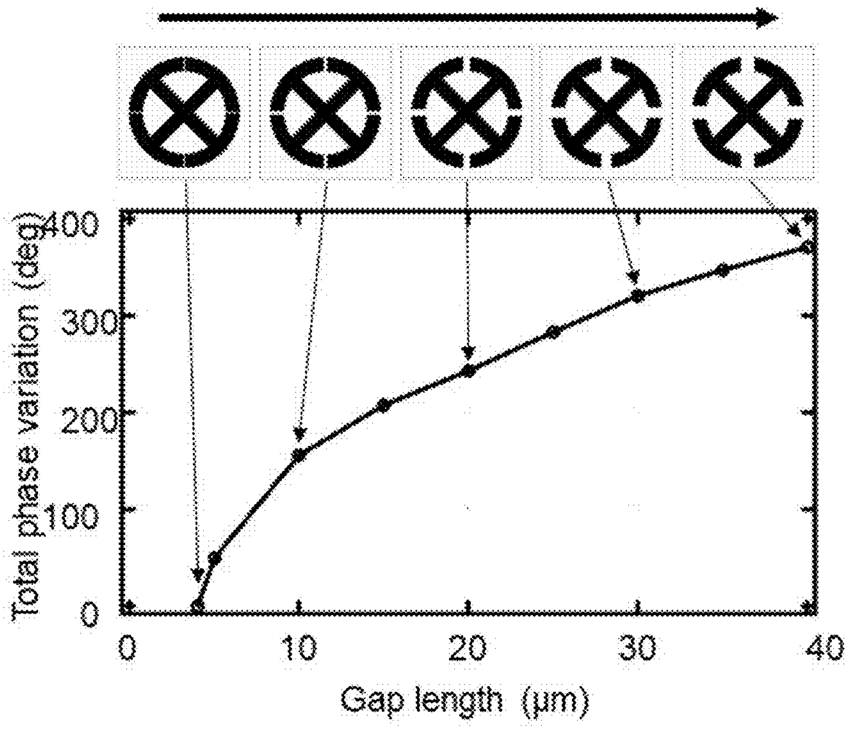
FIG. 12 is a view for explaining the operation of a beamformer according to the second embodiment of the present invention.

FIG. 12 shows the total phase variation with respect to the change of a gap length g of a round Jerusalem cross. Here, a cell period a is the same, and a=380 μm. A radius r is the same, and r=160 μm. and w=20 μm.

The gap length g was gradually changed from 4 μm to 40 μm to change the phase in the range of 360 degrees, thereby performing wide angle passive beamforming of the input electromagnetic wave. Without using active elements, the metamaterial beamformer based on an organic material is formed by conductive metamaterial cells having a variable shape and a dielectric filling material As shown in FIG. 12, in the beamformer according to this embodiment, when the gap length g changes from 5 μm to 40 μm, the total phase variation changes from 0 degrees to about 370 degrees. By changing the geometric feature, for example, the gap length in the metamaterial cell, the inductance and/or the capacitance of the metamaterial cell can be changed, and the phase can be changed.

In this embodiment, an example in which the gap length g is changed as the geometric feature of the metamaterial cell of a resonant cell has been described. However, the present invention is not limited to this. A gap structure decided by the width w of the metamaterial medium and the thickness t of the metamaterial medium of the metamaterial cell, including the gap length g, may be changed. In addition, not only these but also a geometric feature such as a length (for example, including R in FIG. 3) may be changed. It is only necessary to change at least one of the inductance and the capacitance of the metamaterial cell and obtain a phase variation.

As described above, a phase variation of 360 degrees (2π) or more can be obtained by the basic configuration of the beamformer according to the above described embodiment. Based on the above described basic configuration, as in the first embodiment, when the metamaterial beamformer is configured by arraying multilayer cells and setting the geometric features of the cells such that at least one of the inductance and the capacitance changes, and the phase appropriately changes, beamforming adjustable in a wide angle is possible.

According to the beamformer of this embodiment, as in the first embodiment, beamforming adjustable in a wide angle is implemented. Also, since active elements can be eliminated from the metamaterial beamformer, the fabrication time, cost, and complexity can be reduced.

Third Embodiment

A beamformer according to the third embodiment of the present invention will be described with reference to FIGS. 13 and 14.

(Configuration of Beamformer)

Figure 13:
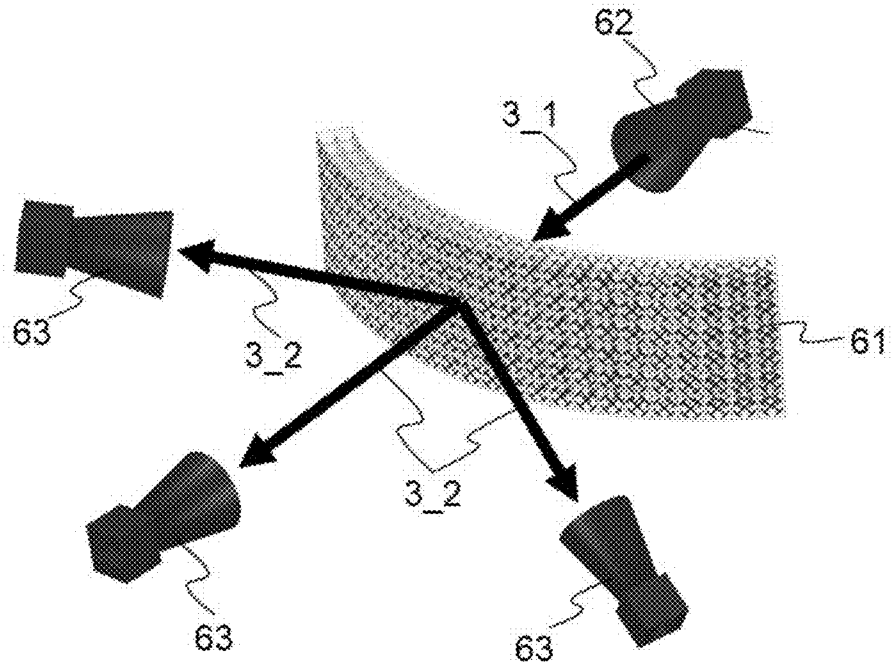
FIG. 13 is a schematic view showing the configuration of a beamformer according to the third embodiment of the present invention.

A beamformer 61 according to this embodiment is a transmit array flexible metamaterial beamformer that is flexible and deformable, as shown in FIG. 13.

The flexible metamaterial beamformer 61 includes multilayer metamaterial cells, a dielectric filling material, and active elements (variable capacitance elements).

The flexible metamaterial beamformer 61 is based on a polymer and arranged on the surface of a curved substrate. As the substrate of the flexible metamaterial beamformer 61, the surface of a typical cylindrical shape such as a pole or a pillar is used. Here, the curvature of the substrate controls transmission or reflection of the array of beamforming. As described above, in the flexible metamaterial beamformer 61, multilayer metamaterial cells are arranged in the form of a curved surface.

From the back surface side of the substrate, a millimeter wave (signal) 3_1 is input from a radiation element 62 such as an antenna. The incident input wave 3_1 is radiated from the radiation element 62 and transmitted through the flexible metamaterial beamformer 61. The phase variation of the input wave 3_1 when passing through the beamformer 61 depends on the lumped capacitance value of active elements and the curvature of the beamformer 61.

On the curved surface, the phase of the signal propagating from the inside (incident surface) to the outside (exit surface) of the curved portion needs to be additionally compensated by active control.

More specifically, since the beamformer 61 is curved, the phase of the incident electromagnetic wave changes depending on the position where the electromagnetic wave 3_1 enters the transmit array beamformer 61. For example, the phase at the beamformer center is 0 degrees, and the phase at a beamformer end is 45 degrees. Hence, the capacitance of the metamaterial is controlled by a lumped active element, thereby compensating for the phase that changes depending on the incident electromagnetic wave and outputting a combined wave 3_2.

In a flat beamformer, the phase of the incident wave maintains the same regardless of the position of the beamformer. Hence, the above-described phase compensation is not needed.

In a passive beamformer, the curvature, size, and shape of the base surface are decided together with passive metamaterial cells such that the incident electromagnetic wave is transmitted in a desired direction.

(Operation of Beamformer)

Figure 14:
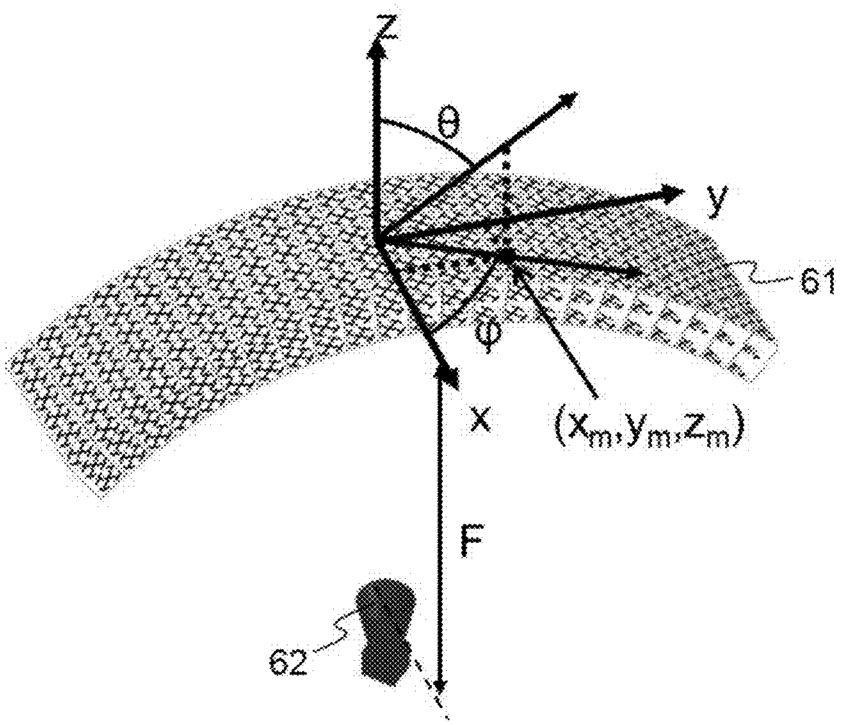
FIG. 14 is a schematic view showing the configuration of the beamformer according to the third embodiment of the present invention.

FIG. 14 shows a schematic view of the flexible metamaterial beamformer 61 irradiated by a feed antenna. Normally, the relative phase of a transmitted wave in an arbitrary cell m of the flexible metamaterial beamformer is calculated by Equation 7

$$\varphi_m(x_m y_m z_m) = \varphi_F(\theta_m, \phi_m) - k_0 r_m + \varphi_{inc}(\theta_F, \phi_F) + \Psi_{m0} \tag{7}$$

where $\phi_F(\theta_m, \phi_m)$ is the phase of the input wave 3_1 radiated from the radiation element 62 in the direction $(\theta_m, \phi_m)$ of a metamaterial cell m. $k_0$ is the wavenumber at the operating frequency, $r_m$ is the phase center distance between the radiation element 62 and a unit cell, F is the focal length, $(x_m, y_m, z_m)$ are the coordinates of the metamaterial cell m, $\phi_{inc}(\theta_F, \phi_F)$ is the phase of a pattern radiated from the metamaterial cell m in the direction $(\theta_m, \phi_m)$ from the radiation element 62, and $\psi_{m0}$ is a phase shift introduced by the unit cell m. In addition, $\theta_m$ and $\phi_m$ are the azimuth angle and the elevation angle, respectively.

Furthermore, the steering direction of the main beam in the direction $(\theta_m, \phi_m)$ is represented by Equation 8

$$\varphi_m(x_m y_m z_m) = -k_0(\sin(\Theta_0)\cos(\phi_0)x_m + \sin(\Theta_0)\sin(\phi_0)y_m + \cos(\Theta_0)z_m) \tag{8}$$

where $\Theta_0$ and $\phi_0$ are $\Theta$ and $\phi$ for m=0, that is, at the center, respectively.

From equations (7) and (8), a desired phase shift for each metamaterial cell is represented by Equation 9

$$\Psi_{m0} = k_0(r_m - \sin(\Theta_0)\cos(\phi_0)x_m - \sin(\Theta_0)\sin(\phi_0)y_m - \cos(\Theta_0)z_m) - \varphi_{inc}(\theta_F, \phi_F) - \varphi_F(\theta_m, \phi_m) \tag{9}$$

The phase distribution in the opening portion of the deformable flexible transmit array metamaterial beamformer 61 is decided using this equation, and the combined output wave is two-dimensionally steered in a wide angle.

When the desired steering angle is decided, the desired phase shift for each metamaterial cell is calculated, and a bias voltage to be applied to the active elements is correctly controlled, thereby setting the appropriate value of the lumped capacitance in the active array.

In addition, equations (7) to (9) can be applied to a metamaterial beamformer having a curved structure and a metamaterial beamformer having a flat structure. Particularly for the metamaterial beamformer with a flat structure, the equations are simplified to equations (1) and (2).

According to the beamformer of this embodiment, in addition to the effects of the first and second embodiments, steering in a wider angle can be performed using a curved base.

Fourth Embodiment

A beamformer according to the fourth embodiment of the present invention will be described with reference to FIGS. 15A and 15B.

(Configuration of Beamformer)

Figure 15A:
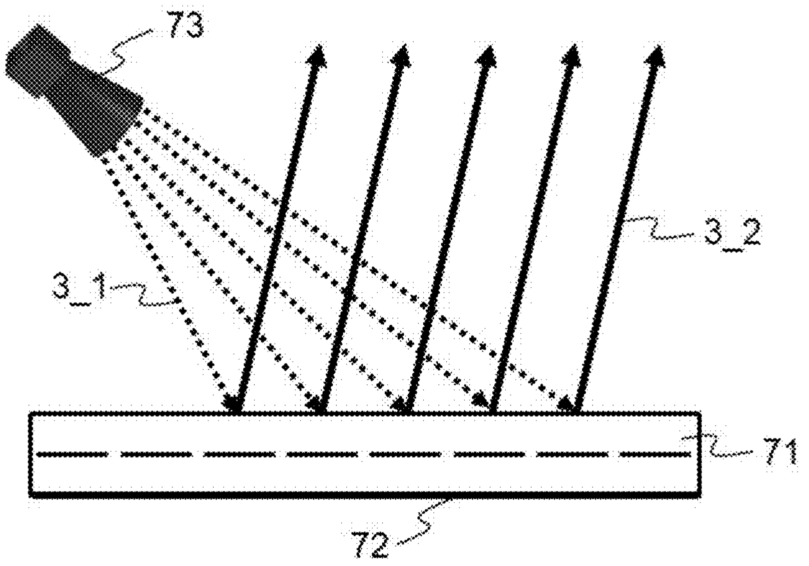
FIG. 15A is a schematic plan view showing the configuration of a beamformer according to the fourth embodiment of the present invention.
Figure 15B:
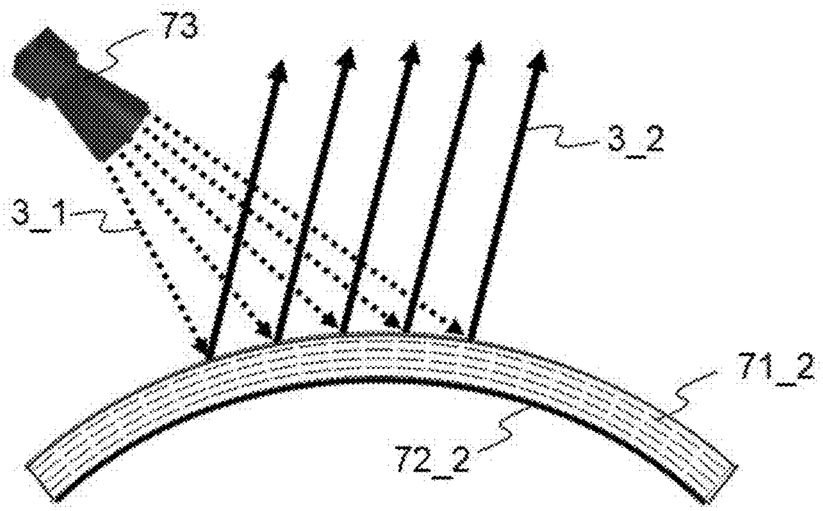
FIG. 15B is a schematic plan view showing the configuration of the beamformer according to the fourth embodiment of the present invention.

Each of beamformers 71 and 71_2 according to this embodiment is a reflectarray flexible metamaterial beamformer that is flexible and deformable, as shown in FIGS. 15A and 15B, and is based on an organic material.

The reflectarray flexible metamaterial beamformers 71 and 71_2 are designed to change the output direction of an incident millimeter wave by reflection. The reflection is caused by phases set for different groups of the beamformer.

Here, a set phase is set actively by a variable capacitance element (a varactor diode, a transistor, or the like). The phase may be set passively by the shape or size of each element in the beamformer.

(Operation of Beamformer)

FIGS. 15A and 15B show the operations of the reflectarray flexible metamaterial beamformers 71 and 71_2 having a planar shape and a spherical shape, respectively. An incident wave 3_1 is radiated from an antenna to the metamaterial beamformer, reflected as a combined wave (combined reflected wave 3_2), and steered in a preset direction.

A feature of the reflectarray flexible metamaterial beamformers 71 and 71_2 is a phase shift caused by the metamaterial cells of the reflectarray, which are arranged in a lattice pattern. The phase shift compensates for the spatial phase delay of the signal 3_1 transmitted from a feed antenna 73 and forms the wavefront of the combined output wave 3_2.

Also, each of ground planes 72 and 72_2 reflects all incident beams and minimizes the transmission (transmission loss) of the incident wave in the beamformer.

According to the beamformer of this embodiment, in addition to the effects of the first and second embodiments, a beam can be reflected and steered in a wider angle using a curved base.

In the embodiments of the present invention, an example in which a round Jerusalem cross is used as the geometric shape type of a metamaterial cell has been described. However, the present invention is not limited to this, and the same effects can be obtained even if a metamaterial cell having any other geometric shape type shown in FIG. 2 is used. Also, the present invention is not limited to these. Even if the metamaterial cell has another shape, any configuration having the function of a metamaterial and capable of causing a phase variation can be used.

In the beamformers according to the embodiments of the present invention, using the same geometric shape type of the metamaterial cells is preferable because the design is easy. The beamformer can operate even if different geometric shape types of the metamaterial cells are used.

In the embodiments of the present invention, an example in which the input signal and the output signal of the beamformer have the same frequency has been described. However, the beamformer can operate even if the input signal and the output signal have different frequencies.

In the embodiments of the present invention, examples of the structure, dimensions, material, and the like of each component are shown in the configuration of the beamformer, and the like. However, the present invention is not limited to this. It is only necessary to attain the function of the beamformer and obtain the effects.

INDUSTRIAL APPLICABILITY

Embodiments of the present invention is related to a beamformer, and can be applied to a millimeter-wave antenna or the like in high-frequency wireless communication.

REFERENCE SIGNS LIST

10 . . . beamformer

The invention claimed is:

1. A beamformer configured to perform beamforming of an input electromagnetic wave and output an output electromagnetic wave, the beamformer comprising:

a cell comprising a metamaterial; and a filling material configured to fill a periphery of the cell, wherein the metamaterial is made a conductive organic material or a nanocarbon material, the filling material is made of a nonconductive organic material, and the cell has an inductance and a capacitance, and wherein a phase of the input electromagnetic wave is changed by a change of the inductance or the capacitance, wherein:

the cell includes a metamaterial medium which includes a gap, the beamformer comprises a capacitance element connected in parallel with the gap, the capacitance of the cell is an equivalent capacitance of a capacitance of the gap and a capacitance of the capacitance element, and the capacitance of the capacitance element is configured to be changed by an applied voltage.

2. The beamformer according to claim 1, wherein the cell has a multilayer structure.

3. The beamformer according to claim 1, wherein a size of the cell is not more than half a wavelength of the input electromagnetic wave.

4. The beamformer according to claim 1, wherein the cell is one of a plurality of cells of the beamformer, wherein each of the plurality of cells comprises the metamaterial, and the plurality of cells is arranged in a matrix.

5. The beamformer according to claim 4, wherein a respective capacitance of each cell of the plurality of cells does not vary along a first one of a row direction or a column direction of the matrix, and a respective inductance or the respective capacitance of each of the plurality of cells varies along a second one of the row direction or the column direction.

6. The beamformer according to claim 1, wherein the inductance or the capacitance of the cell is based on a geometric feature of the cell.

7. The beamformer according to claim 6, wherein the cell has a multilayer structure.

8. The beamformer according to claim 6, wherein a size of the cell is not more than half a wavelength of the input electromagnetic wave.

9. The beamformer according to claim 6, wherein:

the cell is one of a plurality of cells of the beamformer, wherein each of the plurality of cells comprises the metamaterial, and the plurality of cells is arranged in a matrix.

10. The beamformer according to claim 9, wherein a respective capacitance of each cell of the plurality of cells does not vary along a first one of a row direction or a column direction of the matrix, and a respective inductance or the respective capacitance of each of the plurality of cells varies along a second one of the row direction or the column direction.

11. The beamformer according to claim 2, wherein a size of the cell is not more than half a wavelength of the input electromagnetic wave.

12. The beamformer according to claim 2, wherein the cell is one of a plurality of cells of the beamformer, wherein each of the plurality of cells comprises the metamaterial, and the plurality of cells is arranged in a matrix.

13. The beamformer according to claim 3, wherein:
the cell is one of a plurality of cells of the beamformer,
each of the plurality of cells comprises the metamaterial, and
the plurality of cells is arranged in a matrix.

14. The beamformer according to claim 1, wherein:
the cell is one of a plurality of cells of the beamformer,
each of the plurality of cells comprises the metamaterial, and
the plurality of cells is arranged in a matrix.

15. The beamformer according to claim 14, wherein:
a respective capacitance of each cell of the plurality of cells does not vary along a first one of a row direction or a column direction of the matrix, and
a respective inductance or the respective capacitance of each of the plurality of cells varies along a second one of the row direction or the column direction.

16. The beamformer according to claim 15, wherein the plurality of cells is arranged in a curved surface.

17. The beamformer according to claim 14, wherein the plurality of cells is arranged in a form of a curved surface.

18. A beamformer configured to perform beamforming of an input electromagnetic wave and output an output electromagnetic wave, the beamformer comprising:
a cell comprising a metamaterial; and
a filling material configured to fill a periphery of the cell, wherein:
the metamaterial is a conductive organic material or a nanocarbon material,
the filling material is made of a nonconductive organic material,
the cell has an inductance and a capacitance, and
a phase of the input electromagnetic wave is changed by a change of the inductance or the capacitance, and wherein:
the inductance or the capacitance of the cell is based on a geometric feature of the cell,
the cell has a multilayer structure, and
the multilayer structure comprises a structure in which a plurality of metamaterials is stacked.

19. A beamformer configured to perform beamforming of an input electromagnetic wave and output an output electromagnetic wave, the beamformer comprising:
a cell comprising a metamaterial; and
a filling material configured to fill a periphery of the cell, wherein:
the metamaterial is a conductive organic material or a nanocarbon material,
the filling material is made of a nonconductive organic material,
the cell has an inductance and a capacitance, and
a phase of the input electromagnetic wave is changed by a change of the inductance or the capacitance, and wherein:
the inductance or the capacitance of the cell is based on a geometric feature of the cell,
the cell has a multilayer structure,
the multilayer structure comprises a structure in which a plurality of metamaterials is stacked,
the cell is one of a plurality of cells of the beamformer,
each of the plurality of cells comprises the metamaterial, and
the plurality of cells is arranged in a matrix.

* * * * *